(12) United States Patent
Oakey

(10) Patent No.: US 6,837,071 B2
(45) Date of Patent: Jan. 4, 2005

(54) NITROGEN REJECTION METHOD AND APPARATUS

(75) Inventor: John Douglas Oakey, Godalming (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 10/611,387

(22) Filed: Jul. 1, 2003

(65) Prior Publication Data

US 2004/0079108 A1 Apr. 29, 2004

(30) Foreign Application Priority Data

Jul. 16, 2002 (GB) .............................. 0216537

(51) Int. Cl.$^7$ ................ F25J 3/02; F25J 3/08
(52) U.S. Cl. ........................ 62/631; 62/927
(58) Field of Search .............. 62/618, 620, 627, 62/631, 927

(56) References Cited

U.S. PATENT DOCUMENTS

| | | | | |
|---|---|---|---|---|
| 3,996,030 A | * | 12/1976 | Scheibel | 62/622 |
| 4,158,556 A | * | 6/1979 | Yearout | 62/622 |
| 4,272,270 A | * | 6/1981 | Higgins | 62/623 |
| 4,588,427 A | * | 5/1986 | Yao et al. | 62/634 |
| 4,710,213 A | * | 12/1987 | Sapper et al. | 62/631 |
| 5,421,165 A | * | 6/1995 | Paradowski et al. | 62/621 |
| 6,609,393 B2 | * | 8/2003 | Oakey | 62/620 |

FOREIGN PATENT DOCUMENTS

| | | |
|---|---|---|
| DE | 2 154 965 | 5/1973 |
| EP | 0 577 349 A1 | 1/1994 |
| EP | 0 725 256 A1 | 8/1996 |
| EP | 1 258 690 A1 | 11/2002 |

OTHER PUBLICATIONS

M. Ruhemann, "Cryogenin Techniques in Enhanced Recovery of Oil and Gas," Indian Journal of Cryogenics, 1984, vol. 9, No. 4, pp. 256–261.

* cited by examiner

Primary Examiner—William C. Doerrler
(74) Attorney, Agent, or Firm—Philip H. Von Neida

(57) ABSTRACT

Nitrogen is rejected from a feed gas stream comprising methane and nitrogen so as to form a methane product. The feed gas is separated in a double rectification column comprising a higher pressure rectification column 14, a lower pressure rectification column 16, and a condenser-reboiler 18. Product methane is withdrawn from the column 16 by a pump 42 and is vaporised. A flow of gas is recycled from the column 16 to the column 14, being warmed in main heat exchanger 4. A first part of the warmed recycle gas being compressed in compressor 48 to a first pressure and introduced into the higher pressure rectification column 14. A second part of the warmed recycle gas is compressed in the compressor 48 and condensed in a second condenser-reboiler associated with an intermediate main exchange region of the lower pressure column 16 and is returned to the higher pressure rectification column 14.

13 Claims, 1 Drawing Sheet

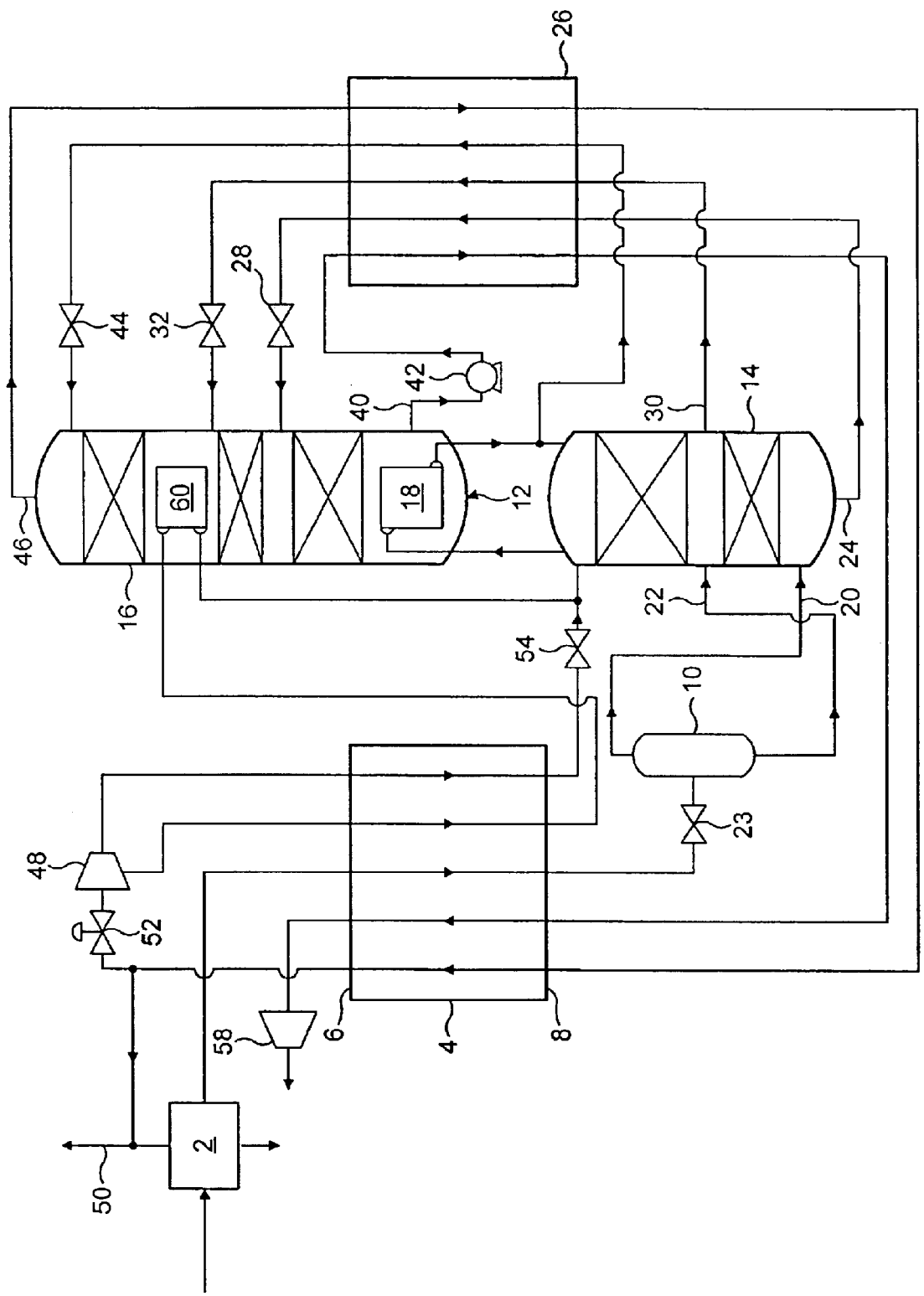

US 6,837,071 B2

NITROGEN REJECTION METHOD AND APPARATUS

FIELD OF THE INVENTION

This invention relates to a method of and apparatus for rejecting nitrogen from a feed gas stream comprising methane and nitrogen so as to form a methane product.

It is known to have produced natural gas from underground reservoirs. The natural gas is often contaminated with nitrogen. The nitrogen may be totally naturally occurring. Alternatively, at least a part of the nitrogen may have been introduced into the reservoir as part of an enhanced oil recovery (EOR) or enhanced gas recovery (EGR) exploration.

BACKGROUND OF THE INVENTION

U.S. Pat. No. 4,415,345 discloses a process for rejecting the nitrogen from the methane in a double rectification column operating at cryogenic temperatures. A double rectification column comprises a higher pressure rectification column, a lower pressure rectification column, and a condenser-reboiler placing the top of the higher pressure rectification column in indirect heat exchange relationship with a region, usually the bottom, of the lower pressure rectification column. In the process according to U.S. Pat. No. 4,415,345 a stream of a mixture of nitrogen and methane at elevated pressure is cooled to a temperature suitable for its separation by rectification. The stream is at least partially liquefied by passage through a condenser-reboiler associated with the bottom of the lower pressure rectification column. A part of the bottom liquid fraction separated in this column is therefore reboiled to provide an upward flow of vapour through the column. Remaining liquid is employed as a feed to the lower pressure rectification column in which a relatively pure liquid methane product is separated as the bottom fraction. A stream of the resulting liquid methane is withdrawn from the lower pressure column and is raised in pressure by a pump. It is warmed by heat exchange to approximately ambient temperature and is thus vaporised. In order to enhance the liquid nitrogen reflux available to the double rectification column the stream of nitrogen is withdrawn from the top of the lower pressure rectification column, is compressed in a compressor to the operating pressure of the higher pressure rectification column and is combined with a nitrogen stream flowing from the top of the higher pressure column to the condenser-reboiler thermally linking the lower pressure rectification column thereto. As a result, the compressed nitrogen is condensed. A part of the condensate is returned to the lower pressure rectification column and another part to the higher pressure rectification column. The flow of fluid from the lower pressure rectification to the higher pressure rectification column via the compressor acts as a heat pump. A heat exchanger is incorporated in the heat pump so as to remove heat of compression. The heat exchanger is separate from those in which the pumped product methane stream is warmed.

At certain nitrogen concentrations, typically in the range of 15 to 30% by volume in the feed gas, a pinch occurs in the lower pressure rectification column. We have discovered that the position of this pinch point depends on the nitrogen concentration. As the nitrogen concentration approaches 30% so the higher becomes the position of the pinch. This gives rise to difficulties in the separation process and can lead to either a reduction in the methane recovery or an increase in the specific power consumption.

SUMMARY OF THE INVENTION

According to the present invention there is provided a method of rejecting nitrogen from a feed gas stream comprising methane and nitrogen so as to form a methane product, comprising cooling the feed gas stream in a main heat exchanger, rectifying the cooled feed gas stream in a double rectification column comprising a higher pressure rectification column, a lower pressure rectification column, and a first condenser-reboiler, the first condenser-reboiler placing a top region of the higher pressure rectification column in heat exchange relationship with a bottom region of the lower pressure rectification column, recycling a flow of gas from the lower pressure rectification column to the higher pressure rectification column, the recycle flow being warmed, a first part of the warmed recycle gas flow being compressed to a first pressure, cooled, and introduced at least in part into the higher pressure rectification column, withdrawing a product methane stream in liquid state from the lower pressure rectification column, raising the pressure of the liquid product methane stream, and vaporising the liquid product methane stream, wherein a second part of the warmed recycle gas flow is compressed to a second pressure lower than the first pressure, is cooled, and is condensed in a second condenser-reboiler associated with an intermediate mass exchange region of the lower pressure rectification column.

The invention also provides apparatus for rejecting nitrogen from a feed gas stream comprising methane and nitrogen so as to form a methane product, comprising a main heat exchanger for cooling the feed gas stream, a double rectification column rectifying the cooled feed gas stream, the double rectification column comprising a higher pressure rectification column, a lower pressure rectification column, and a first condenser-reboiler operable to place a top region of the higher pressure rectification column in heat exchange relationship with a bottom region of the lower pressure rectification column, a plurality of pathway for recycling vapour from the lower pressure rectification column to the higher pressure rectification column, the pathways comprising a first higher pressure pathway, comprising in sequence warming passages, compression means, and cooling passages, and a second lower pressure pathway comprising, in sequence, warming passages, compression means, cooling passages and a second condenser-reboiler, the second condenser-reboiler being in heat exchange relationship with an intermediate mass exchange region of the lower pressure rectification column, a pump for withdrawing liquid methane product from a bottom region of the lower pressure rectification column, and a heat exchange means for vaporising the methane product.

The method and apparatus according to the invention make it possible to set the distribution of the warmed recycle gas between the first recycle gas flow and the second recycle gas flow according to the position of the pinch point in the lower pressure rectification column. If the nitrogen concentration is in the order of 15% by volume most or all of the recycle gas (nitrogen) is taken as the first part of the recycle gas flow. At higher nitrogen concentrations up to about 30% by volume the pinch point in the lower pressure rectification column tends to move upwards. In such a situation, the relative proportion of the recycle gas flow that is sent to the second condenser-reboiler (and therefore forms the second part of the recycle gas flow) is increased so as to increase the vapour flow through the pinch point. Thus, relatively efficient operation of the lower pressure rectification column can be maintained. Preferably, the first part of the recycle gas flow is cooled to a liquefaction temperature in the same heat exchanger in which the product methane stream is vaporised.

Preferably, recycle gas flow is warmed in the main heat exchanger. Preferably, both said parts of the recycle flow are cooled in the main heat exchanger.

If the first pressure is a sub-critical pressure the first part of the recycle flow is partially preferably liquefied in the said heat exchanger. If the first pressure is above the critical pressure, the first part of the recycle flow is preferably cooled in the main heat exchanger to sufficiently low a temperature that it is partially liquefied on being expanded to the operating pressure of the higher pressure rectification column.

By preferably performing the vaporisation of the product methane and the cooling of the recycle stream in the same heat exchanger, the temperature-enthalpy profile of the streams being warmed in the heat exchanger may be kept close to that of the streams being cooled therein than in the prior process described in U.S. Pat. No. 4,415,345. As a result, the thermodynamic inefficiency of the process is reduced.

Preferably, a vent stream is taken from the recycle gas flow upstream of its compression and is vented from the method and apparatus according to the invention. Preferably, there is a flow control valve or other means operable to control the size of the recycle stream that is compressed.

The recycle gas flow is preferably warmed in the main heat exchanger. The first and second pathways preferably share common warming passages.

There are a number of different options for forming the first and second parts of the warmed recycle gas flow. Typically, they are compressed in the same compressor, which is provided with a plurality of stages so as to enable the first part of the recycle gas flow to be produced at a higher pressure than the second part. Alternatively, there may be separate compressors for compressing the two parts of the recycle gas flow.

The second part of the recycle flow is preferably all introduced into the higher pressure rectification column downstream of its passage through the second condenser-reboiler.

Preferably, for optimum thermodynamic efficiency, a part of the incoming feed gas stream is liquefied. If desired the resulting partially liquefied feed gas stream may be subjected to phase separation, the resulting vapour phase being introduced into a bottom region of the higher pressure rectification column and at least part of the liquid phase being introduced into an intermediate mass exchange region of the higher pressure rectification column. Preferably, the remainder of the liquid phase is introduced into the lower pressure rectification column at an intermediate mass exchange region thereof. Alternatively, all the liquid phase may be passed into an intermediate mass exchange region of the higher pressure rectification column and a stream of liquid withdrawn from intermediate region of the higher pressure rectification column and introduced into the lower pressure rectification column.

Preferably, all the bottom fraction separated in the higher pressure rectification column is withdrawn therefrom and is sent to the lower pressure rectification column. There is therefore no reboiling of this fraction in the higher pressure rectification column.

BRIEF DESCRIPTION OF THE DRAWINGS

The method according to the invention will now be described by way of example with reference to the accompanying drawing which is a schematic flow diagram of a nitrogen rejection plant.

The drawing is not to scale.

DETAILED DESCRIPTION OF THE INVENTION

A stream of natural gas or gaseous nitrogen-methane mixture is recovered by known means not forming part of this invention from an underground oil or gas reservoir. The stream is typically recovered at a pressure in the order of 40 bar and contains from 15 to 30% by volume of nitrogen. The stream may be subjected to preliminary treatment (not shown) in order to remove any hydrogen sulphide or other sulphur-containing impurity therefrom. Such purification of natural gas is well known in the art and need not be referred to in further detail herein. After removal of any such hydrogen sulphide impurity, the elevated pressure methane-nitrogen stream still typically contains water vapour impurity. The water vapour is removed by passage through a purification unit 2. Purification unit 2 preferably comprises a plurality of adsorption vessels containing adsorbent able selectively to adsorb water vapour from the feed gas stream. Such purification units typically operate on a pressure swing adsorption or a temperature swing adsorption cycle, the latter generally being preferred. If the feed gas stream also contains carbon dioxide impurity, the purification unit 2 can additionally contain an adsorbent selective for carbon dioxide so as to effect the carbon dioxide removal.

The resulting purified feed gas stream now consisting essentially of nitrogen and methane flows through a main heat exchanger 4 from its warm end 6 to its cold end 8. The main heat exchanger 4 comprises a plurality of heat exchange blocks preferably joined together to form a single unit. Downstream of the main heat exchanger 4, the feed gas stream is expanded through a throttling valve 23 into a phase separator 10. Depending on its pressure, the feed gas stream is either liquefied in the main heat exchanger 4 or on expansion through the throttling valve 23. Typically, depending on its composition, at least 75 vol % of the feed gas stream is liquefied. In consequence, the vapour flow from the phase separator 10 is relatively small in comparison with the gas flow into the plant. This makes possible the use of a smaller diameter higher pressure rectification column than would otherwise be required. The vapour is disengaged from the liquid in the phase separator 10. The stream of the vapour phase flows from the top of the phase separator 10 through an inlet 20 into the bottom region of the higher pressure rectification column 14 forming part of the double rectification column 12 with the lower pressure rectification column 16 and a first condenser-reboiler 18 thermally linking the top of the higher pressure rectification column 14 to the bottom of the lower pressure rectification column 16. The stream of the liquid phase flows from the bottom of the phase separator 10 into an intermediate mass exchange region of the higher pressure rectification column 14 through another inlet 22. Typically the feed gas stream enters and leaves the purification unit at a pressure well in excess of the operating pressure via pressure rectification columns 14. As a result, refrigeration is created by passage of the feed stream through the throttling valve 23. This refrigeration meets most of the refrigeration requirements of the method according to the invention and as a result there is typically no need to provide any turbo-expander for this purpose.

The feed gas mixture is separated in the higher pressure rectification column 14 into a vaporous nitrogen top fraction and a liquid methane-enriched bottom fraction. A stream of the methane-enriched bottom fraction is withdrawn from the higher pressure rectification column 14 through a bottom outlet 24 and sub-cooled by passage through a further heat exchanger 26. The resulting sub-cooled methane-enriched liquid stream flows through a throttling valve 28 and is introduced into an intermediate mass exchange region of the lower pressure rectification column 16. In addition, a liquid stream comprising methane and nitrogen is withdrawn from an intermediate mass exchange region of the higher pressure rectification column 14 through an outlet 30, is sub-cooled by passage through the further heat exchanger 26, is passed through a throttling valve 32 and is introduced into a second intermediate mass exchange region of the lower pressure rectification column 16 located above the first intermediate mass exchange region.

The streams comprising methane and nitrogen are separated in the lower pressure rectification column 16 in order to form a top nitrogen vapour fraction and a bottom product liquid methane fraction. The stream of the bottom fraction is withdrawn through an outlet 40 from the lower pressure rectification column 16 and is raised in pressure by operation of a pump 42. The resulting pressurised product liquid methane stream is passed through the further heat exchanger 26 countercurrently to the streams being sub-cooled therein. The pressurisation of the product liquid methane stream has the effect of raising its pressure above its saturation pressure. Thus, in effect, the pressurised liquid methane product stream is in sub-cooled state as it enters the further heat exchanger 26. It is warmed in the further heat exchanger 26 to remove the sub-cooling. It is preferred that no vaporisation of the liquid methane product stream takes place in the further heat exchanger 26. The warmed liquid methane product stream passes from the heat exchanger 26 through the main heat exchanger 4 from its cold end of 6 to its warm end 8. It is vaporised as it passes through the main heat exchanger 4. The vaporised methane product is compressed to a desired product delivery pressure in a product compressor 58.

Reflux for the higher pressure rectification column 14 and the lower pressure rectification column 16 is formed by taking nitrogen vapour from the top of the higher pressure rectification column 14 and condensing it in the condensing passages of the first condenser-reboiler 18. A part of the resulting condensate is returned to the higher pressure rectification column 14 as reflux. The remainder is sub-cooled by passage through the further heat exchanger 26 and is passed through a throttling valve 44 into the top of the lower pressure rectification column 16 and therefore provides liquid reflux for that column.

A nitrogen vapour stream is withdrawn from the top of the lower pressure rectification column 16 through an outlet 46, and is warmed by passage through the further heat exchanger 26. The resulting warmed nitrogen stream is further warmed to approximately ambient temperature by passage through the main heat exchanger 4 from its cold end 8 to its warm end 6. The warmed nitrogen flow at approximately ambient temperature is divided into 3 sub-streams. One sub-stream is compressed in a recycle compressor 48 having a plurality of stages. A second sub-stream of the warmed nitrogen flow from the main heat exchanger 4 is employed in the regeneration of the adsorbent beds in the purification unit 2. A third sub-stream of the nitrogen is vented to atmosphere through a vent pipeline 50 as a waste stream. The relative size of the recycle stream is determined by the position of an adjustable flow control valve 52 on the inlet side of the recycle compressor 48.

The recycle gas flow entering the compressor 48 is divided therein into 2 parts. The first part passes through all the stages of the compressor 48 and flows along a first branch of the recycle path through the main heat exchanger 4 from its warm end 6 to its cold end 8. The resulting cooled stream of nitrogen is returned to an upper region of the higher pressure rectification column 14 through a throttling valve 54. The first part of the nitrogen recycle flow is typically compressed to a supercritical pressure in the recycle compressor 48 and is cooled in the main heat exchanger 4 to a temperature sufficiently low for it to be partially liquefied by expansion through the throttling valve 54. The relative amounts of liquid issuing from the valves 23 and 54 may be arranged so as to achieve appropriate vapour loading of the higher pressure column 14. The flow of the first part of the recycle gas through the main heat exchanger 4 helps to match the composite temperature-enthalpy profile of the streams being cooled in the main heat exchanger 4 more closely to that of the streams being warmed therein than if this part of the recycle gas flowed through a separate heat exchanger.

An intermediate pressure stream nitrogen is also withdrawn from the recycle compressor 48 and passes through a second branch of the recycle gas pathway. Thus the intermediate pressure stream flows through the main heat exchanger 4 from its warm end 6 to its cold end 8. The intermediate pressure gas stream remains in gaseous state during this passage. The intermediate pressure nitrogen is introduced into the condensing passages of a second condenser-reboiler 60 associated with the chosen intermediate mass-exchange level of the lower pressure rectification column 16. This level is typically that at which the liquid from the intermediate region of the higher pressure rectification column 14 flows into the lower pressure rectification column 16 via the throttling valve 32. The second condenser-reboiler 60 has the effect of increasing the flow of vapour in the upper region of the lower pressure rectification column 16 while at the same time increasing the availability of liquid nitrogen reflux to the rectification columns 14 and 16. The additional vapour flow through the upper region of the lower pressure rectification column 16 is particularly effective in increasing the efficiency at which this column operates in the event that there is a pinch point in the column in its upper region. The liquid nitrogen condensate formed in the second condenser-reboiler 60 is typically recombined with the first flow of recycle gas downstream of the throttling valve 54. The intermediate pressure at which the second part of the recycle gas flow is taken from the recycle compressor 48 is typically chosen to be essentially the operating pressure of the higher pressure rectification column 14. As the nitrogen content of the feed rises so the proportion of the flow through the valve 54 that issues as liquid is decreased.

The two parts of the recycle gas flow perform a heat pumping duty which enhances the production of liquid reflux for the rectification columns 14 and 16.

In a typical example of the method according to the invention, the feed gas may be received at a pressure of about 40 bar, the higher pressure rectification column 14 may operate at a pressure at its bottom in the range of 16.5 to 27 bar and the lower pressure rectificaton column 16 may operate at a pressure at its bottom in the range 1.3 to 2.7 bar. The product methane pressure may be in the range of 17 to 28 bar and the higher pressure part of the recycle gas flow is preferably taken from the recycle compressor 48 at a pressure in the range of 50 to 70 bar. The large pressure difference between the operating pressure of the higher pressure rectification column 14 and the operating pressure of the lower pressure rectification column 16 can create difficulties in obtaining efficient heat exchange in the heat pump cycles because the difference in specific heat of nitrogen at the operating pressure of the column 14 and of nitrogen at the operating pressure of the column 16 is quite large. Cooling the nitrogen in the main heat exchanger 4 reduces the difficulty. Further, the relative vapour flow rates in the lower and upper parts of the lower pressure rectification column 16 can be adjusted in accordance with the precise composition of the feed gas so as to maximise the efficiency with which the lower pressure rectification column 16 operates and thereby to counteract the negative effect on operating efficiency of the pinch point in the column 16, irrespective of the position of this pinch point.

High recoveries of methane, typically in the order of 98.5% are able to be obtained.

What is claimed is:

1. A method of rejecting nitrogen from a feed gas stream comprising methane and nitrogen so as to form a methane product, comprising cooling the feed gas stream in a main heat exchanger, rectifying the cooled feed gas stream in a double rectification column comprising a higher pressure rectification column, a lower pressure rectification column, and a first condenser-reboiler, the first condenser-reboiler placing the top region of the higher pressure rectification column in heat exchange relationship with a bottom region of the lower pressure rectification column, recycling a flow of gas from the lower pressure rectification column to the higher pressure rectification column, the recycle gas flow being warmed, a first part of the warmed recycle gas being compressed to a first pressure, cooled, and introduced at least in part into the higher pressure rectification column, withdrawing a product methane stream in liquid state from the lower pressure rectification column, raising the pressure of the liquid product methane stream, and vaporising the liquid product methane stream, wherein a second part of the warmed recycle gas flow is compressed to a second pressure lower than the first pressure, is cooled, and is condensed in a second condenser-reboiler associated with an intermediate mass exchange region of the lower pressure rectification column.

2. The method according to claim 1, wherein a vent stream is taken from the recycle stream and is vented.

3. The method according to claim 2, additionally including the step of controlling the size of the recycle stream that is vented.

4. The method according to claim 1, in which said first pressure is above the critical pressure of the recycle gas, and the first part of the recycle flow is cooled in the main heat exchanger to sufficiently low a temperature that it is liquefied on being expanded to the operating pressure of the higher pressure rectification column.

5. The method according to claim 1, in which the entire first part of the recycle gas flow is introduced into the higher pressure rectification column.

6. The method according to claim 1, in which at least 75% of the feed gas stream is liquefied upstream of the higher pressure rectification column.

7. The method according to claim 6, in which the partially liquefied feed stream is subjected to phase separation, at least part of the resulting liquid phase being introduced into an intermediate mass exchange region of the higher pressure rectification column, and the vapour phase being introduced into the bottom of the higher pressure rectification column.

8. The method according to claim 1, in which the pressurised liquid product methane stream is warmed without being vaporised in a further heat exchanger upstream of its vaporisation in the main heat exchanger.

9. The method according to claim 1, in which both parts of the recycle gas flow are compressed in the same plural stage compressor.

10. Apparatus for rejecting nitrogen from a feed gas stream comprising methane and nitrogen so as to form a methane product, comprising a main heat exchanger for cooling the feed gas stream, a double rectification column rectifying the cooled feed gas stream, the double rectification column comprising a higher pressure rectification column, a lower pressure rectification column, and a first condenser-reboiler operable to place a top region of the higher pressure rectification column in heat exchange relationship with a bottom region of the lower pressure rectification column, a plurality of pathway for recycling vapour from the lower pressure rectification column to the higher pressure rectification column, the pathways comprising a first higher pressure pathway, comprising in sequence warming passages, compression means, and cooling passages, and a second lower pressure pathway comprising, in sequence, warming passages, compression means, cooling passages and a second condenser-reboiler, the second condenser-reboiler being in heat exchange relationship with an intermediate mass exchange region of the lower pressure rectification column, a pump for withdrawing liquid methane product from a bottom region of the lower pressure rectification column, and a heat exchange means for vaporising the methane product.

11. The apparatus according to claim 10 in which the said heat exchange means for vaporising the methane product is the main heat exchanger itself.

12. The apparatus according to claim 10, wherein the cooling and warming passages of the first and second pathways are provided by the main heat exchanger.

13. The apparatus according to claim 12, in which the first and second pathways share common warming passages.

* * * * *